(12) United States Patent
Philipson et al.

(10) Patent No.: US 11,754,862 B2
(45) Date of Patent: *Sep. 12, 2023

(54) POLARIZATION SCRAMBLER USING A RETARDANCE ELEMENT

(71) Applicant: VIAVI SOLUTIONS INC., Chandler, AZ (US)

(72) Inventors: Joshua Philipson, Ottawa (CA); Christopher Russell Wagner, Kanata (CA); Luis Andre Neves Paiva Fernandes, Maia (PT)

(73) Assignee: VIAVI SOLUTIONS INC., Chandler, AZ (US)

(*) Notice: Subject to any disclaimer, the term of this patent is extended or adjusted under 35 U.S.C. 154(b) by 0 days.

This patent is subject to a terminal disclaimer.

(21) Appl. No.: 17/979,114

(22) Filed: Nov. 2, 2022

(65) Prior Publication Data
US 2023/0105391 A1    Apr. 6, 2023

Related U.S. Application Data

(63) Continuation of application No. 16/436,481, filed on Jun. 10, 2019, now Pat. No. 11,526,035.

(51) Int. Cl.
*G02F 1/01*   (2006.01)
*H04B 10/532*   (2013.01)
(Continued)

(52) U.S. Cl.
CPC ......... *G02F 1/0136* (2013.01); *G02B 3/0087* (2013.01); *G02B 6/2786* (2013.01);
(Continued)

(58) Field of Classification Search
CPC ... H04B 10/2569; H04B 10/532; H04J 14/06; G02B 6/2786; G02B 3/0087; G02F 1/0139; G02F 1/0136
(Continued)

(56) References Cited

U.S. PATENT DOCUMENTS

| 4,923,290 A | * 5/1990 | Brinkmeyer .......... G02F 1/0134 |
| | | 385/11 |
| 6,498,869 B1 | 12/2002 | Yao |

(Continued)

OTHER PUBLICATIONS

Koch et al.; Endless Optical Polarization Control at 56 krad/s, over 50 Gigaradian, and Demultiplex of 112-GB/s PDM-RZ-DQPSK Signals at 3.5 krad/s; Oct. 2010; IEEE Journal of selected topics in quantum electronics vol. 16, No. 5, pp. 1-6. (Year: 2010).*

(Continued)

*Primary Examiner* — Amritbir K Sandhu
(74) *Attorney, Agent, or Firm* — MANNAVA & KANG, P.C.

(57) ABSTRACT

A polarization scrambler using a retardance element (RE) is disclosed. The polarization scrambler may include an optical fiber input to transmit an optical signal, and a beam expander to receive and expand the optical signal to create an expanded optical signal. The polarization scrambler may include a retardance element (RE) to cause a polarization scrambling effect on the expanded optical signal and to create a scrambled expanded optical signal. The polarization scrambler may include a beam reducer to receive and reduce the scrambled expanded optical signal to create a scrambled optical signal. The polarization to scrambler may include an optical fiber output to receive scrambled optical signal. The optical fiber output may transmit the scrambled optical signal to one or more downstream optical components.

20 Claims, 6 Drawing Sheets

(51) Int. Cl.
*H04B 10/2569* (2013.01)
*H04J 14/06* (2006.01)
*G02B 3/00* (2006.01)
*G02B 6/27* (2006.01)

(52) U.S. Cl.
CPC ....... *H04B 10/2569* (2013.01); *H04B 10/532* (2013.01); *H04J 14/06* (2013.01); *G02F 1/0139* (2021.01)

(58) Field of Classification Search
USPC .......................................................... 359/256
See application file for complete search history.

(56) References Cited

U.S. PATENT DOCUMENTS

| | | | |
|---|---|---|---|
| 6,710,831 B1 | 3/2004 | Winker et al. | |
| 10,866,438 B2 | 12/2020 | Philipson et al. | |
| 11,067,837 B2* | 7/2021 | Pau | G02F 1/0136 |
| 11,526,035 B2* | 12/2022 | Philipson | H04J 14/06 |
| 2003/0138184 A1* | 7/2003 | Noe | G02F 1/0136 |
| | | | 385/11 |
| 2003/0179363 A1 | 9/2003 | Wang et al. | |
| 2006/0023987 A1* | 2/2006 | Yao | G02B 6/2766 |
| | | | 385/11 |
| 2006/0250835 A1* | 11/2006 | Junginger | G02F 1/035 |
| | | | 365/145 |
| 2008/0158644 A1* | 7/2008 | Isomura | G02B 27/28 |
| | | | 359/484.02 |
| 2009/0002579 A1 | 1/2009 | Tan | |
| 2009/0257106 A1* | 10/2009 | Tan | H04N 9/3126 |
| | | | 359/279 |
| 2011/0027494 A1 | 2/2011 | Tan et al. | |
| 2012/0237206 A1* | 9/2012 | Izumi | H04B 10/614 |
| | | | 398/25 |
| 2013/0077151 A1* | 3/2013 | Yao | G02F 1/0136 |
| | | | 359/290 |
| 2014/0285878 A1 | 9/2014 | Escuti et al. | |
| 2016/0011353 A1 | 1/2016 | Escuti et al. | |
| 2018/0177404 A1* | 6/2018 | Liu | A61B 5/0084 |
| 2020/0064662 A1* | 2/2020 | Pau | G02F 1/0136 |

OTHER PUBLICATIONS

Koch et al; Endless Optical Polarization Control at 56 Krad/s, Over 50 Gigaradian, and demultiplex of 112-GB/s PDM-RZ_DQPSK signals at 3.5 Krad/s; Nov. 2010; IEEE, vol. 16, No. 5, pp. 1158-1163 (Year: 2010).

Koch et al.; Endless Optical Polarization Control at 56 krad/s, Over 50 Gigaradian, and Demultiplex of 112-GB/s PDM-RZ-DQPSK Signals at 3.5 krad/s, Oct. 2010; IEEE; pp. 1-6. (Year: 2010).

Kraemer et al.; Achromatic retarder In polarization optics; Jan. 2019; Society of Photo-optical Instrumentation Engineers; pp. 1-15. (Year: 2019).

Liu et al; Real time measurement of Full field Retardation Near quarter Wavelength; Dec. 2012; Journal of the optical society of Korea; pp. 457-461. (Year: 2012).

* cited by examiner

POLARIZATION SCRAMBLER USING A RETARDANCE ELEMENT

PRIORITY

This patent application is a Continuation of commonly assigned and co-pending U.S. patent application Ser. No. 16/436,481, filed Jun. 10, 2019, the disclosure of which is hereby incorporated by reference in its entirety.

TECHNICAL FIELD

This patent application is directed to optical measurements in telecommunication networks, and more specifically, to a polarization scrambler using a retardance element for mitigating polarization dependent loss (PDL) and other polarization-dependent and related effects.

BACKGROUND

Polarization-dependent effects often have undesirable effects in fiber-optic systems. These adverse effects may include polarization-dependent loss (PDL) in various optical components and devices. Polarization may be uncontrolled and allowed to passively drift in a network, or it may be controlled deliberately in certain cases, say, for test and measurement. When controlled, it is generally controlled using controllers or scramblers.

Existing polarization controllers and scramblers can be expensive to manufacture, configure, and operate, and usually offer only limited or minimum range of control. These challenges are exacerbated in high-speed, in-fiber, defeatable polarization scramblers, where polarization-dependent effects can become quite rampant and difficult to mitigate. As a result, a low-cost and effective solution for mitigating polarization-dependent and related effects may be needed to overcome the shortcomings of traditional approaches.

BRIEF DESCRIPTION OF DRAWINGS

Features of the present disclosure are illustrated by way of example and not limited in the following Figure(s), in which like numerals indicate like elements, in which.

DETAILED DESCRIPTION

Figure 1:
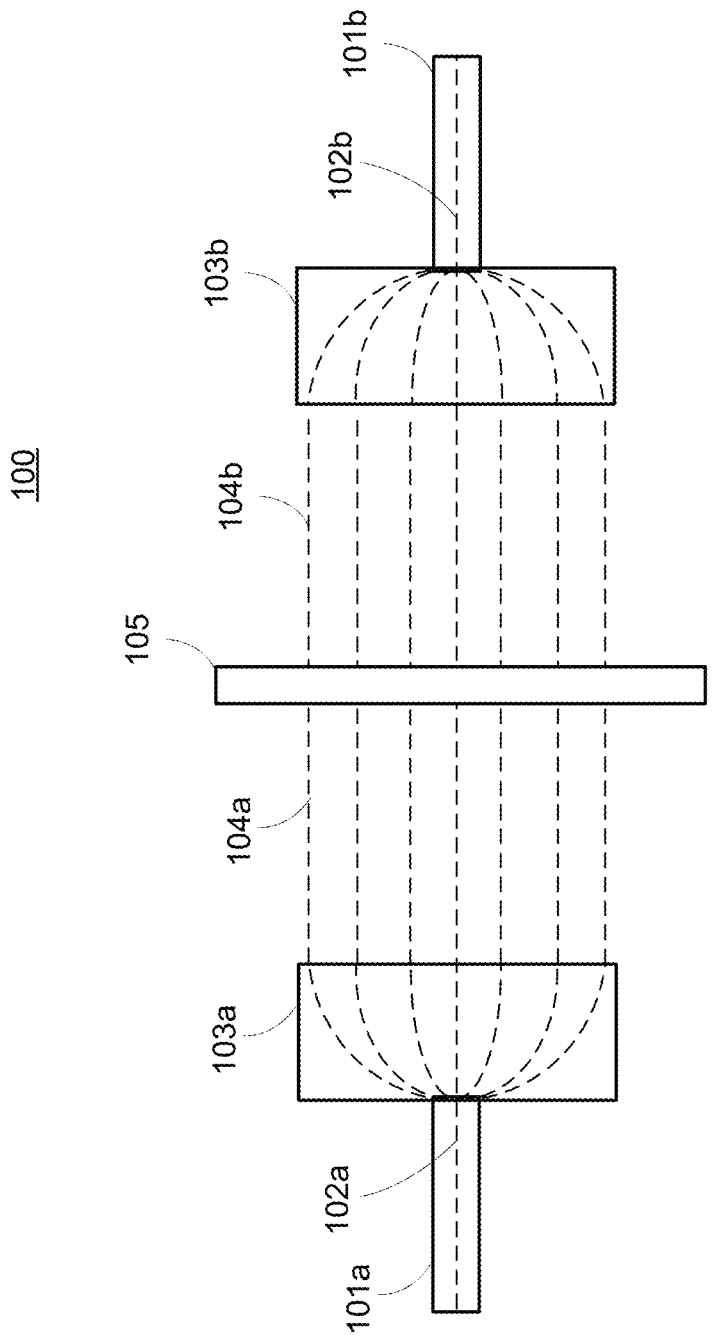
FIG. 1 illustrates a polarization scrambler using a retardance element (RE), according to an example.

For simplicity and illustrative purposes, the present disclosure is described by referring mainly to examples and embodiments thereof. In the following description, numerous specific details are set forth in order to provide a thorough understanding of the present disclosure. It will be readily apparent, however, that the present disclosure may be practiced without limitation to these specific details. In other instances, some methods and structures readily understood by one of ordinary skill in the art have not been described in detail so as not to unnecessarily obscure the present disclosure. As used herein, the terms "a" and "an" are intended to denote at least one of a particular element, the term "includes" means includes but not limited to, the term "including" means including but not limited to, and the term "based on" means based at least in part on.

As described above, polarization-dependent effects often have undesirable effects in fiber-optic systems. These adverse effects may include polarization-dependent loss (PDL) in various optical components and devices. These effects may arise, for example, in systems that variously measure a quantities maximum polarization-dependent variation, or alternatively, a quantities average value over all polarization states.

Polarization is a fundamental property of light and describes vibrations of a transverse optical wave. In classical physics, light is an electromagnetic wave. Polarization is defined in terms of pattern traced out in the transverse plane by the tip of an electric field vector as a function of time.

For unpolarized light the electric field vector, may fluctuate randomly in the transverse plane, along the direction of light beam propagation. Therefore, on average, no direction may be especially favored. The rate of the fluctuation may be so fast that a detector cannot discern state of polarization (SOP) at any instant of time. In such a state, the light may be effectively considered unpolarized. A light beam may generally be considered to consist of partially polarized or fully polarized light. Degree of polarization (DOP) is typically used to describe how much in the total light intensity is polarized. For totally polarized light, DOP may be one. On the other hand, for completely unpolarized light, DOP may be zero.

The polarization of light beams may play an important factor in high-speed optical communication network system design. Output light from most high-performance lasers used in long-haul optical communication systems may come from highly polarized light sources, and these components themselves may have polarization sensitive responses. As bit rate increases, fiber optic communication systems may become increasingly sensitive to polarization related impairments, which are usually sought to be minimized. Such impairments may include polarization mode dispersion (PMD) in optical fibers, polarization dependent loss (PDL) in passive optical components, polarization dependent modulation (PDM) in electro-optic modulators, polarization dependent gain (PDG) in optical amplifiers, polarization dependent center wavelength (PDVV) in wavelength-division multiplexing (WDM) filters, polarization dependent response (PDR) in receivers, polarization dependent sensitivity (PDS) in sensors and coherent communication systems, polarization dependent coupling (PDC) in taps, combiners, multicore fibers, etc., and other adverse or related effects.

Polarization is generally manipulated using controllers or scramblers. A polarization controller may be used when a fixed polarization state is desired. A polarization scrambler, on the other hand, may be used when one needs to measure the average performance across all polarizations. In particular, temporal scrambling may be achieved by inducing high frequency SOP (state of polarization) changes. In other words, a polarization scrambler may employ a process of varying the polarization of light so that an average polarization over time is randomized.

Polarization scrambling, in particular, may be used to mitigate polarization-related impairments. A polarization scrambler may "scramble" the polarization of light if the SOP of totally (or partially) polarized light is made to vary randomly at a relatively low rate. At any instant of time, the SOP may be well defined and the DOP may be close to one (1). However, on a time average, the DOP may be close to zero (0). Therefore, the DOP of a scrambled light may depend on the average time or the detection bandwidth of a detector.

Existing polarization scramblers may be based on several technologies. Among the more popular polarization scramblers are fiber-based scramblers (e.g., resonant fiber-coil- and fiber-squeezer-based systems) and electro-optic based scramblers (e.g., LiNbO3). Each of these polarization scramblers may actively change the SOP using a polarization modulation method. Fiber-based scramblers, for example, may be based on actuating a piezoelectric stack or cylinder with fiber-windings to create time-varying birefringence. Electro-optic scramblers may be based on lithium niobate (LiNbO$_3$) to create time-varying polarization scrambling and emulation. Performance of a polarization scrambler may generally be measured by the degree of polarization of the scrambled light over a certain period of time and the uniformity of the SOP Poincare sphere coverage. In practice, the wavelength sensitivity and temperature sensitivity of the performance of the scrambler may also be important for real world applications.

A technical problem with these existing polarization scramblers is that they can be rather expensive to manufacture, configure, or operate, and such scramblers typically offer only limited or minimum range of control and may be limited to narrow wavelength ranges. These challenges are exacerbated in high-speed, in-fiber, defeatable polarization scramblers, where polarization-dependent effects can become quite rampant and difficult to mitigate. It should be appreciated that "defeatabie," as used herein, may refer to an ability or an effect that can be activated or deactivated.

Accordingly, a polarization scrambler that utilizes a retardance element (RE) and an efficient minimalist design may help mitigate polarization-dependent and other related effects in a low-loss, cost-effective way.

FIG. 1 illustrates a polarization scrambler 100 using a retardance element (RE), according to an example. As shown, the polarization scrambler 100 may be an in-fiber polarization scrambler. In some examples, the polarization scrambler 100 may include an optical fiber input 101a that carries an optical signal 102a. The optical fiber input 101a may be connected to a beam expander 103a. The optical signal 102a that enters the beam expander 103a from the optical fiber input 101a may be expanded to become an expanded optical signal 104a. The expanded optical signal 104a may have a wider, larger cross-sectional area relative to the optical signal 102a. The expanded optical signal 104a may travel through a retardance element (RE) 105, which may then "scramble" the expanded optical signal 104a to become a scrambled expanded optical signal 104b. The scrambled expanded optical signal 104b may then be received by a beam reducer 103b, which may be similar to the beam expander 103a but operated in reverse. The beam reducer 103b may shrink the scrambled expanded optical signal 104b to become a scrambled optical signal 102b. The scrambled optical signal 102b may then pass along the optical fiber output 101b to one or more various downstream components or elements (not shown).

The optical fiber input 101a and/or optical fiber output 101b may be a single mode (SM) optical fiber of varying length or thickness. In some examples, the optical fiber input 101a and/or optical fiber output 101b may be a single-mode (SM) optical fiber having a 9 μm core. In this scenario, the optical signal 102a may be expanded by the beam expander 103a to be in a range of several hundred square microns ($\mu^2$) to tens of square millimeters ($mm^2$). It should be appreciated that this range may be larger or smaller, depending on the application or use case of the polarization scrambler 100. In some examples, the optical fiber input 101a and/or optical fiber output 101b may also be a polarization maintaining (PM) optical fiber of varying length or thickness. In this way, there may be additional benefits of allowing the polarization scrambler 100 to be optimized for a defined input SOP, if desired.

The beam expander 103a may include any type of collimator or lens system. In some examples, the beam expander 103a may be a gradient-index (GRIN) lens. In some examples, the beam expander 103a may include any variety of bulk-lenses. It should be appreciated that the beam expander 103a not only expands light, but may causes rays of the expanded optical signal 104a to be parallel with each other. It should be appreciated that the beam reducer 103b may be a symmetric (or near symmetric) version or identical (or near identical) version of the beam expander 103a, but used in reverse, to contract or reduce expanded light. In fact, each of the beam expander 103a and the beam reducer 103b may bidirectional, and therefore, these components may be used interchangeably.

As described herein, the RE 105 may include properties that cause the expanded optical signal 104a to be "scrambled," or to incur prorated spatially-dependent birefringence. In other words, the RE 105 may include properties that treat different parts of the expanded optical signal 104a in different ways to cause a net polarization scrambling effect, as shown in the scrambled expanded optical signal 104b of FIG. 1.

The RE 105 may include any number of materials, contours, or shapes to cause the prorated spatially-dependent birefringence on the expanded optical signal 104a. For instance, in some examples, the RE 105 may include a liquid crystal material, such as a birefringent organic liquid crystal polymer (LCP). In some examples, the RE 105 may include a form-birefringent inorganic thin-film. In some examples, a phase controlled surface treatment or other similar treatment may also be used. Other various materials, elements, or treatments may also be provided.

Figure 2A:
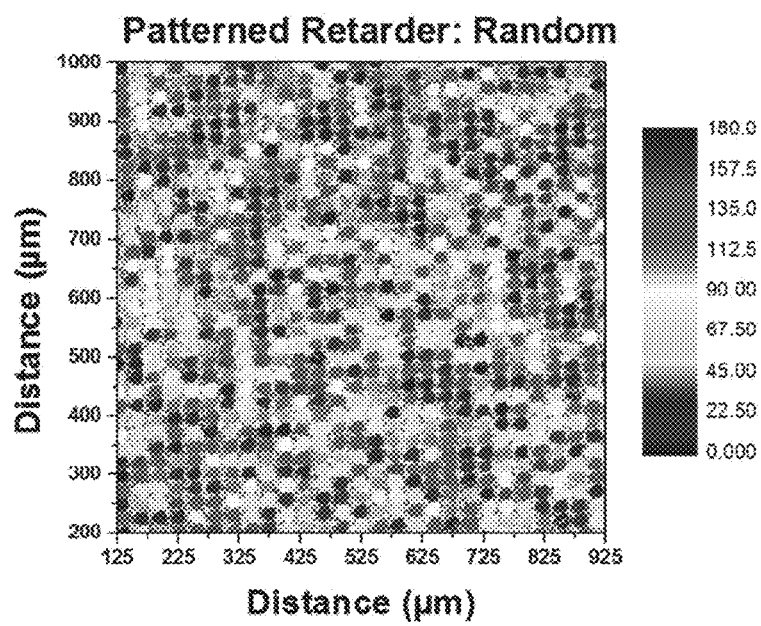
FIG. 2A illustrates a patterned retardance element (PRE) with a randomized pattern, according to an example.

In some examples, the RE 105 may be a patterned retardance element (PRE) that may include any number of different patterns or designs. FIG. 2A illustrates a patterned retardance element (PRE) with a randomized pattern 200A, according to an example. This randomized pattern 200A may effectively divide the expanded optical signal 104a in a plurality of smaller parts and allow the light passing through the PRE, in each of these smaller parts, to be treated in a different way. In effect, the randomized pattern 200A of the PRE 105 may cause each of these smaller parts of the expanded optical signal 104a to encounter different amounts of birefringence, which causes a net polarization scrambling effect, or differing SOP in and across the scrambled expanded optical signal 104b. It should be appreciated that the randomized pattern 200A may include any pattern beyond what is shown. For example, the randomized pattern 200A may be a pixelated pattern, a radial pattern, a wave or zigzag pattern, a line or linear pattern, a checkered pattern, a textured pattern, a scaled pattern, a gradient pattern, or any other pattern may create a birefringent effect.

Figure 2B:
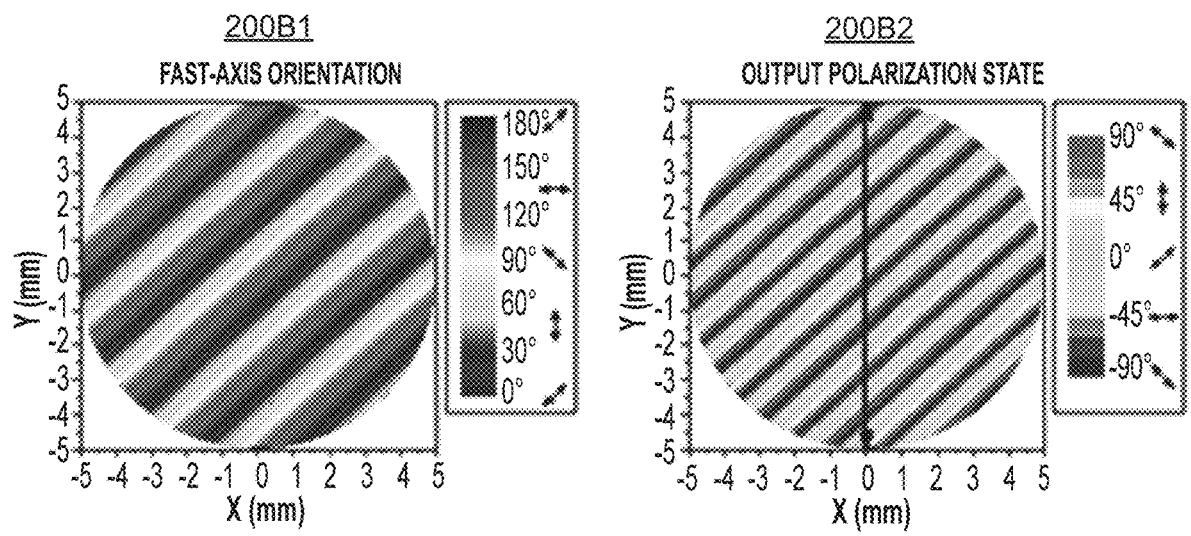
FIG. 2B illustrates graphs of light orientation before passing through a patterned retardance element (PRE) and light orientation after passing through a patterned retardance element (PRE), according to an example.

FIG. 2B illustrates graphs of light orientation before passing through a patterned retardance element (PRE) 200B1 and light orientation after passing through a patterned retardance element (PRE) 200B2, according to an example. The graph 200B1 depicts of light in a fast-axis orientation before passing through the patterned retardance element (PRE) 105. The graph 200B2 depicts of light in an output polarization orientation after passing through the patterned retardance element (PRE) 105. Here, the output SOP may be shown for a particular retarder pattern.

Figure 3:
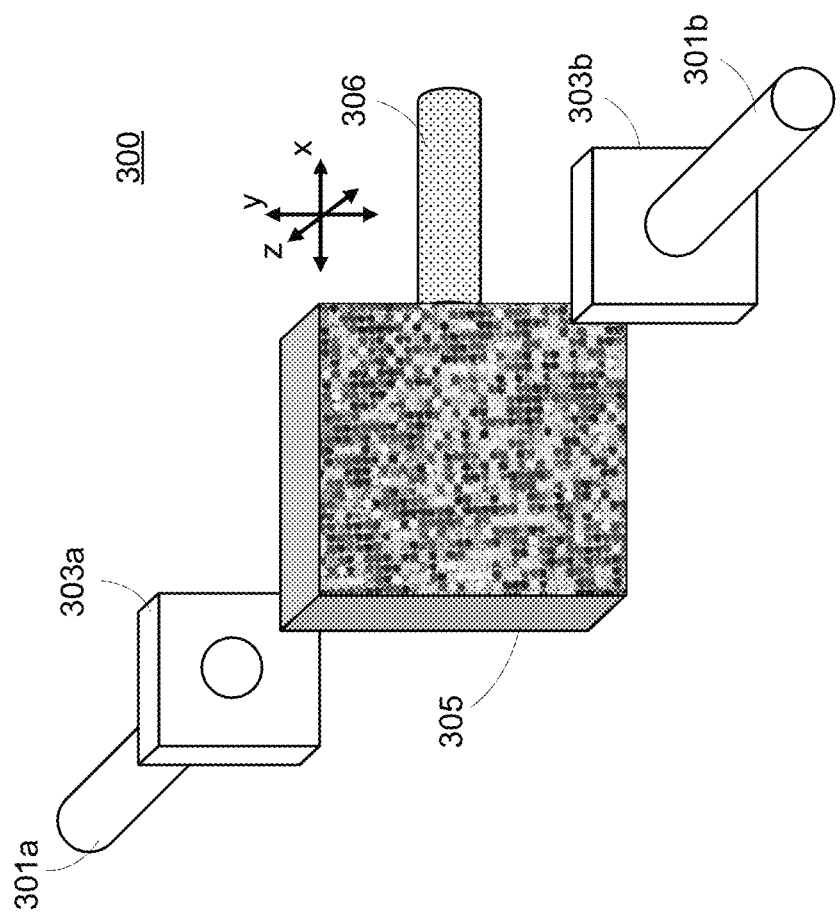
FIG. 3 illustrates a planar view of a polarization scrambler using a patterned retardance element (PRE) in a single fiber configuration, according to an example.

FIG. 3 illustrates a planar view of a polarization scrambler using a patterned retardance element (PRE) in a single fiber configuration 300, according to an example. As shown, the polarization scrambler in a single fiber configuration 300 may include an optical fiber input 301a, a beam expander element 303a, a PRE 305 with a mobile arm 306, a beam reducer 303b, and an optical fiber output 301b. Many of these components are similar to those described with respect to FIG. 1.

It should be appreciated that the mobile arm 306 may be controlled, via a motor or other similar actuation element (not shown), so the PRE 305 can be moved in any direction along an x-, y-, or z-plane. In some examples, the mobile arm 306 may vibrate or oscillate the PRE 305 to enhance or improve the scrambling function. In some examples, the mobile arm 306 may move the PRE 305 in-and-out of the optical path. Other various movements and configurations may also be provided.

In some examples, the beam expander 303a and/or beam reducer 303b may be coated with a birefringent or retardance element, similar to that of the PRE 305 in FIG. 3. Coating the beam expander 303a and/or beam reducer 303b with a birefringent or retardance element may eliminate (or reduce the importance of) a separate and distinct PRE. In some cases, this may reduce cost and create a more efficient, space-saving design for the polarization scrambler.

Figure 4:
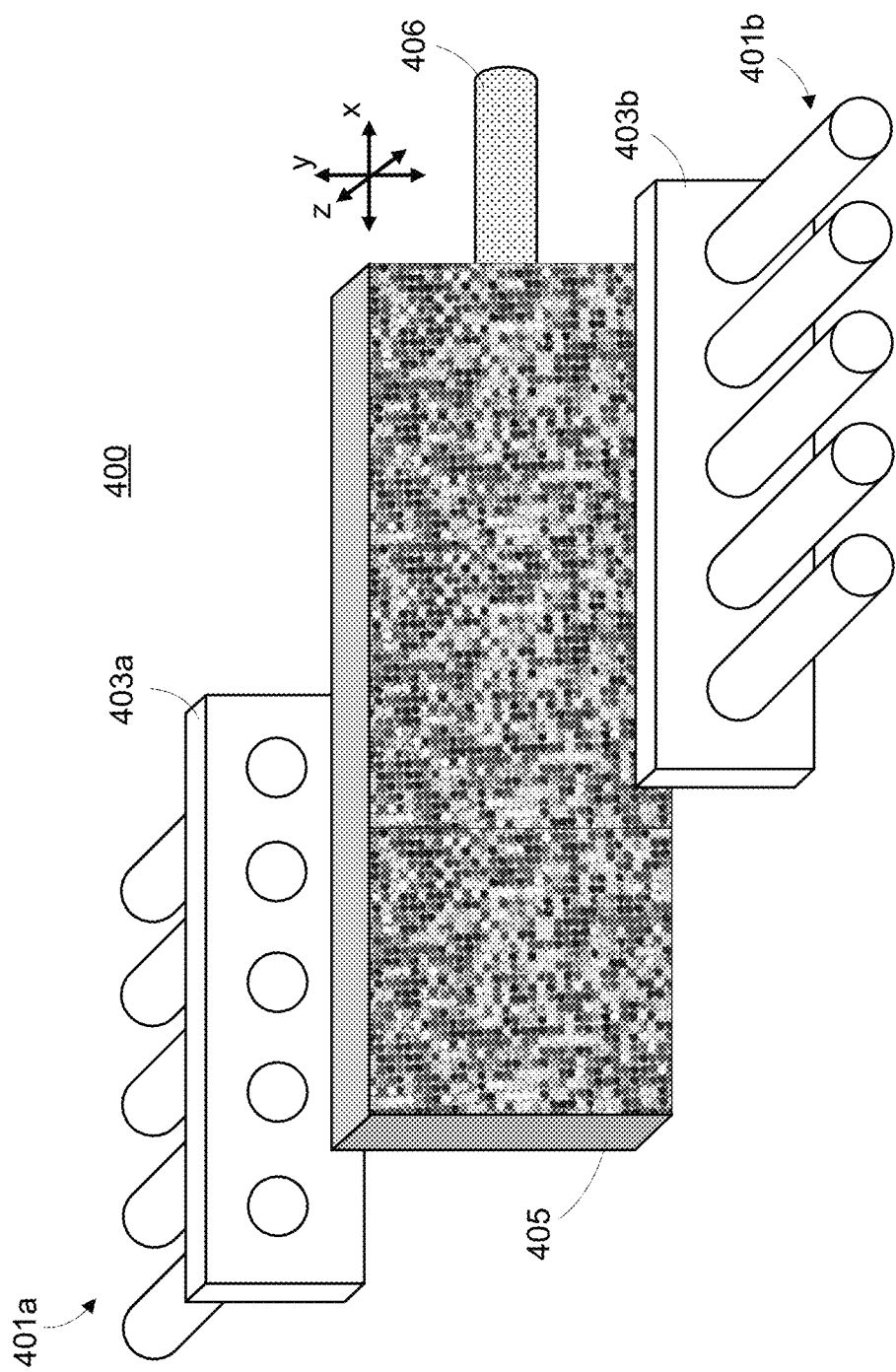
FIG. 4 illustrates a planar view of a polarization scrambler using a patterned retardance element (PRE) in a linear fiber array configuration, according to an example.

FIG. 4 illustrates a planar view of a polarization scrambler using a patterned retardance element (PRE) in a linear fiber array configuration 400, according to an example. The polarization scrambler in the linear fiber array configuration 400 is similar in design and function to the polarization scrambler 100 and 300 of FIGS. 1 and 3, respectively. However, the polarization scrambler in the linear fiber array configuration 400 may include a linear array of optical fiber inputs 401a, a beam expander array element 403a, a PRE 405 with a mobile arm 406, a beam reducer array element 403b, and a linear array of optical fiber outputs 401b. Although the linear array of optical fiber inputs and outputs 401a and 401b are depicted an array of five (5) optical fibers, it should be appreciated that any number of optical fibers may be provided in the linear fiber array configuration 400. While the beam expander 403a and the beam reducer 403b is depicted as a single element, it should also be appreciated that the beam expander 403a and beam reducer 403b may include any number of individual and separate elements.

Figure 5:
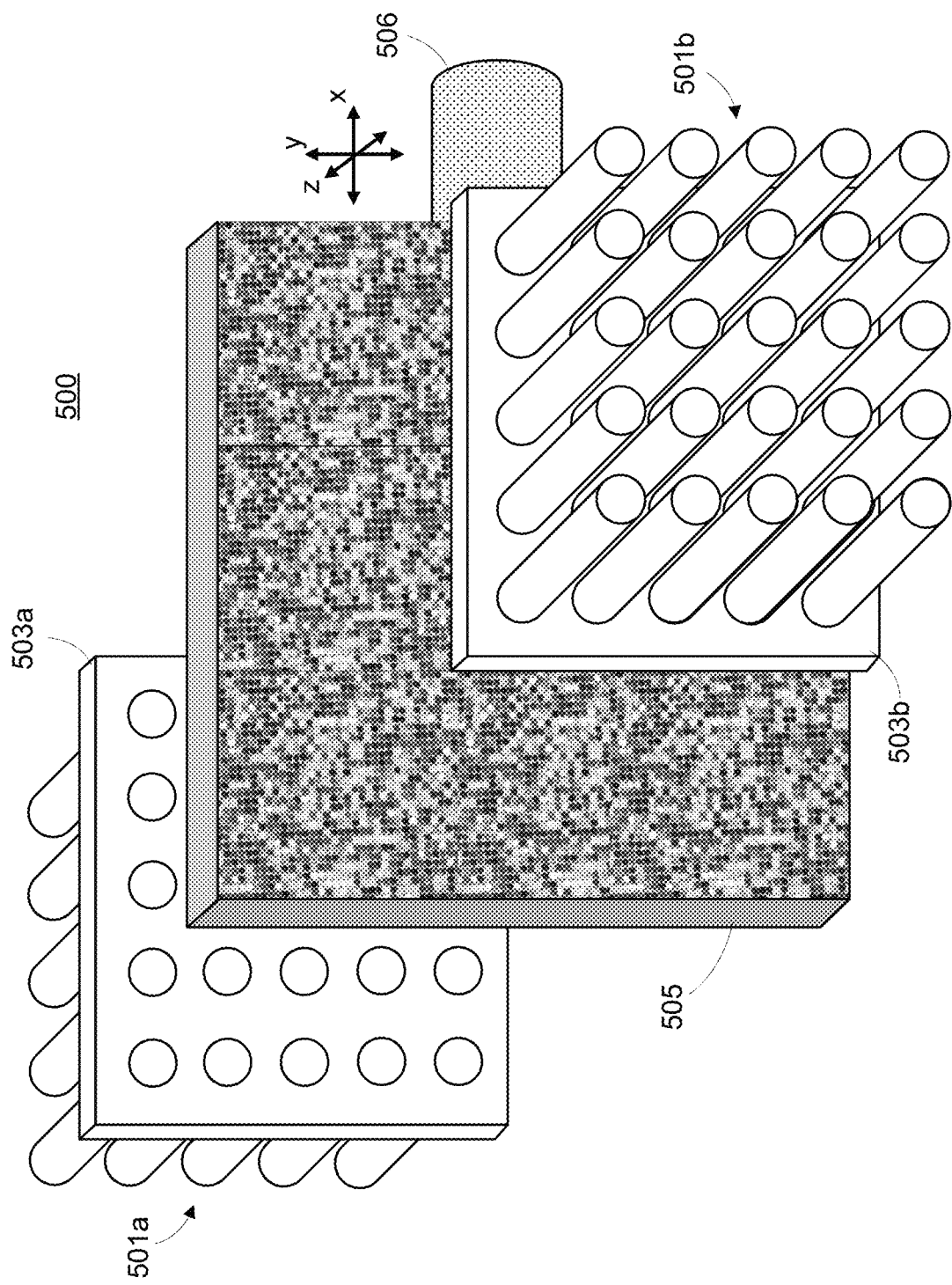
FIG. 5 illustrates a planar view of a polarization scrambler using a patterned retardance element (PRE) in a 5×5 fiber array configuration, according to an example.

FIG. 5 illustrates a planar view of a polarization scrambler using a patterned retardance element (PRE) in a 5×5 fiber array configuration 500, according to an example. The polarization scrambler in the 5×5 fiber array configuration 500 is similar in design and function to the polarization scrambler 400 of FIG. 4. However, the polarization scrambler in the 5×5 fiber array configuration 500 may include a 5×5 array of optical fiber inputs 501a, a beam expander array element 503a, a PRE 505 with a mobile arm 506, a beam reducer array element 503b, and a linear array of optical fiber outputs 501b. Although the linear array of optical fiber inputs and outputs 501a and 501b are depicted an array of 5×5 optical fibers, the configuration may be an N×X fiber array configuration, where N and X may each represent an integer (same or different). Like FIG. 4, it should also be appreciated that the beam expander 503a and the beam reducer 503b may include any number of individual and separate elements.

While examples described herein are directed to configurations as shown, it should be appreciated that any of the components described herein may be altered, changed, replaced, or modified, in size, shape, and numbers, or material, depending on application or use case, and adjusted for desired or optimal polarization scrambling results. For example, the RE/PRE as described herein may also include textured surface, such as a nano-structured surface, that have shape factors to produce birefringence. In some examples, the RE/PRE may include a spatial-light-modulation (SLM) material. The SLM-based RE/PRE may include a pixel array with gray-scaled birefringence tuning capabilities. In some examples, the RE/PRE may be made of a polymer-based material that has domains or regions thereof with varying retardance capabilities. Other variations may also be provided.

Figure 6:
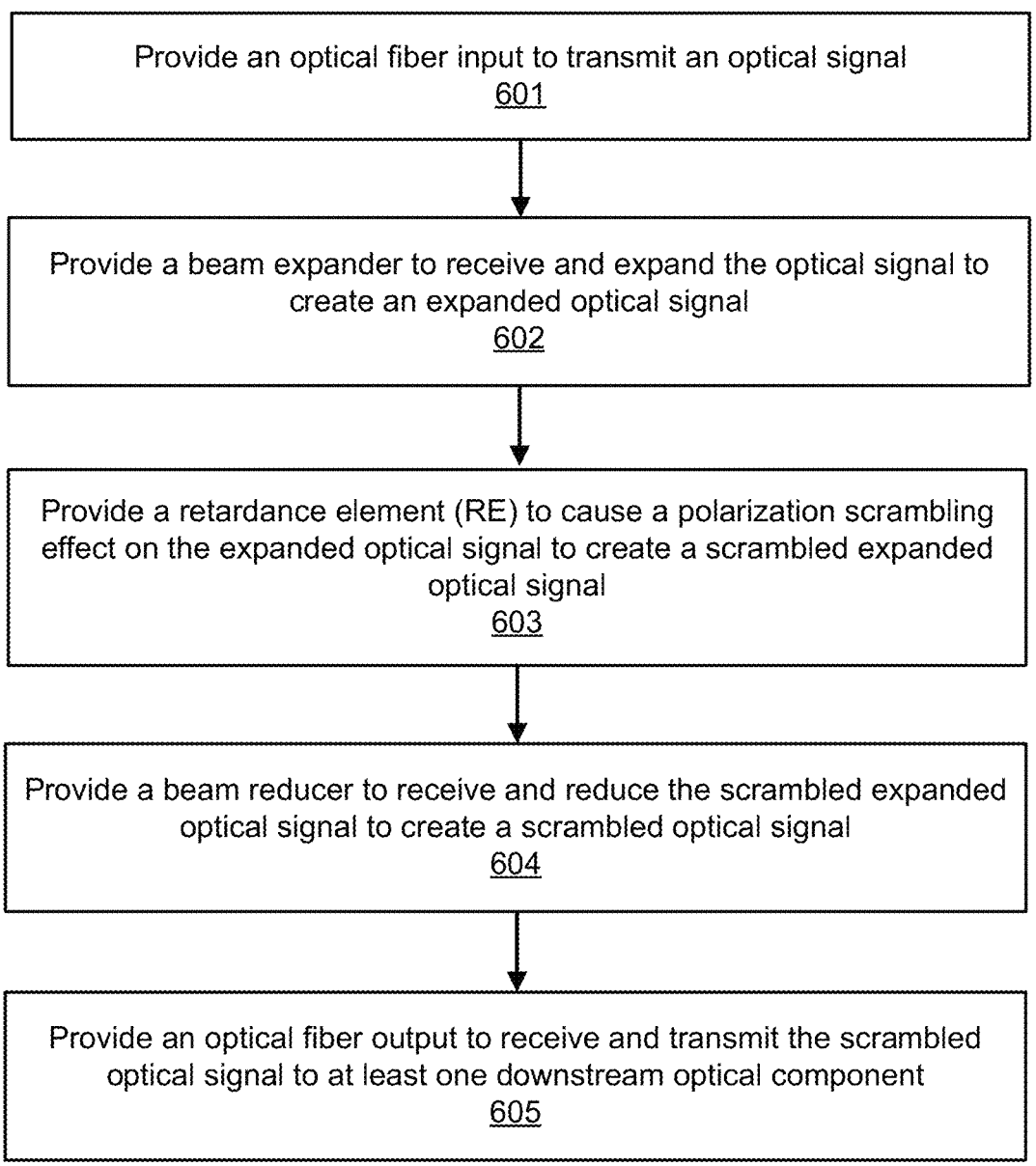
FIG. 6 illustrates a flow chart of a method for using a polarization scrambler with a retardance element (RE), according to an example.

FIG. 6 illustrates a flow chart of a method 600 for making or using a polarization scrambler with a retardance element (RE), according to an example. The method 600 is provided by way of example, as there may be a variety of ways to carry out the method described herein. Although the method 600 is primarily described as being performed by the polarization scrambler shown in configurations 100, 300, 400, and/or 500 of FIGS. 1, 3, 4, and/or 5, respectively, the method 600 may be executed or otherwise performed by one or more processing components of another system or a combination of systems. Each block shown in FIG. 6 may further represent one or more processes, methods, or subroutines, and one or more of the blocks may include machine readable instructions stored on a non-transitory computer readable medium and executed by a processor or other type of processing circuit to perform one or more operations described herein.

At block 601, an optical fiber input may be provided. The optical fiber input may transmit an optical signal. In some examples, the optical fiber input may include an array of N×X optical fibers, where N and X are integers, as described above.

At block 602, a beam expander may be provided. The beam expander may receive and expand the optical signal to create an expanded optical signal. In some examples, the beam expander may include a collimator, a gradient-index (GRIN) lens, a bulk lens, or other beam expansion element. In some examples, the beam expander may comprise a thin film coating that functions like a retardance element (RE), as described above.

At block 603, a retardance element (RE) may be provided. The RE may cause a polarization scrambling effect on the expanded optical signal to create a scrambled expanded optical signal. In some examples, the retardance element (RE) may be formed of a textured material, a polymer, a birefringent material, spatial-light-modulation (SLM) based material, or any material that has domains or regions that causes a scrambling or birefringent effect. In some examples, the birefringent material may include a liquid crystal (e.g., a birefringent organic liquid crystal polymer (LCP), a form-birefringent inorganic dielectric thin film, or a phase controlled surface treatment, as described above. In some examples, the RE may be a patterned retardance element (RE) having a randomized pattern, as described above. In some examples, the retardance element (RE) may also include a motor arm to move the retardance element (RE) in at least one of an x-, y-, or z-plane, as described above.

At block 604, a beam reducer may be provided. The beam reducer may be a similar (but reverse in function) to the beam expander. For example, the beam reducer may receive and reduce the scrambled expanded optical signal to create a scrambled optical signal.

At block 605, an optical fiber output may be provided. The optical fiber output may receive the scrambled optical signal. In some examples, the optical fiber output may transmit the scrambled optical signal to one or more downstream optical components.

It should be appreciated that the polarization scrambler may mitigate polarization-dependent effects by using a retardance element as described herein to synthesize or emulate desired state of polarization (SOP) effects. It should also be appreciated that the polarization scrambler, as described herein, may also include or communicate with other components not shown. For example, these may include external processors, counters, analyzers, computing devices, and other measuring devices or systems. This may also include middleware (not shown) as well. The middleware may include software hosted by one or more servers or devices. Furthermore, it should be appreciated that some of the middleware or servers may or may not be needed to achieve functionality. Other types of servers, middleware, systems, platforms, and applications not shown may also be provided at the back-end to facilitate the features and functionalities of the testing and measurement system.

Moreover, single components may be provided as multiple components, and vice versa, to perform the functions and features described herein. It should be appreciated that the components of the system described herein may operate in partial or full capacity, or it may be removed entirely. It should also be appreciated that analytics and processing techniques described herein with respect to the polarization scrambler, for example, may also be performed partially or in full by other various components of the overall system.

It should be appreciated that data stores may also be provided to the apparatuses, systems, and methods described herein, and may include volatile and/or nonvolatile data storage that may store data and software or firmware including machine-readable instructions. The software or firmware may include subroutines or applications that perform the functions of the polarization scrambler and/or run one or more application that utilize data from the polarization scrambler or other communicatively coupled system.

The various components, circuits, elements, components, and interfaces, may be any number of mechanical, electrical, hardware, network, or software components, circuits, elements, and interfaces that serves to facilitate communication, exchange, and analysis data between any number of or combination of equipment, protocol layers, or applications. For example, the components described herein may each include a network or communication interface to communicate with other servers, devices, components or network elements via a network or other communication protocol.

Although examples are directed to a polarization scrambler for test and measurement systems, it should be appreciated that that polarization scrambler may also be used in other various systems and other implementations. For example, the polarization scramblers and methods, as described herein, may have numerous applications in optical communication networks and fiber sensor systems as well. In some examples, a polarization scrambler may be used at the transmitter side to minimize polarization dependent gain (PDG) or polarization hole burning of erbium-doped fiber amplifiers (EDFA) in ultra-long haul systems. For this application, scrambling rate may be significantly faster than the inverse of gain recover time constant of the fiber amplifiers (e.g., on the order of 10 kHz).

The polarization scramblers and methods, as described herein, may also be used to assist the monitoring of polarization mode dispersion (PMD) in a wavelength-division multiplexing (WDM) system. Generally speaking, PMD may be monitored by measuring degree of polarization (DOP) of an optical data stream propagated through an optical fiber. A small DOP may indicate a large PMD effect. However, such a measurement may be erroneous if input SOP to a transmission fiber is substantially aligned with a principal state of polarization (PSP) of the fiber. For such a situation, the measured DOP may be large no matter how large a differential group delay (DGD) between the two principal states of polarization is. It should be appreciated that a scrambler at the transmitter side may be used to effectively eliminate such an anomaly. Furthermore, it may enable a polarimeter in a PMD compensator at the receiver side to identify the PSP, which in turn may speed up PMD compensation. Other optical network applications include signal-to-noise ratio monitoring of WDM channels, e.g., if a polarizer is placed after a scrambler.

In some examples, the polarization scramblers and methods, as described herein, may also be used to eliminate the polarization fading of a fiber sensor. In such a system, an envelope of a response curve may be independent of polarization fluctuation. Placing a polarization scrambler, for instance, in front of a polarization sensitive instrument, such as diffraction grating based optical spectrum analyzer, may effectively eliminate or reduce its polarization dependence.

It should be appreciated that the polarization scramblers and methods described herein may also be used to help provide, directly or indirectly, measurements for distance, angle, rotation, speed, position, wavelength, transmissivity, and other related optical measurements. With advantages that include low insertion loss, low back reflection, low residual amplitude and phase modulation, low wavelength and temperature sensitivity, low cost, and small form factor, the polarization scramblers and methods described herein may be beneficial in many original equipment manufacturer (OEM) applications, where they may be readily integrated into various and existing network equipment, fiber sensor systems, test and measurement instruments, or other systems and methods. The polarization scramblers and methods described herein may provide mechanical simplicity and adaptability to small or large optical beams. Ultimately, the systems and methods described herein may minimize bulkiness, increase control and modulation, and reduce costs.

What has been described and illustrated herein are examples of the disclosure along with some variations. The terms, descriptions, and figures used herein are set forth by way of illustration only and are not meant as limitations. Many variations are possible within the scope of the disclosure, which is intended to be defined by the following claims—and their equivalents—in which all terms are meant in their broadest reasonable sense unless otherwise indicated.

The invention claimed is:

1. A polarization scrambler comprising:
an optical fiber input to transmit an optical signal;

a beam expander to expand the optical signal from the optical fiber input into an expanded optical signal;

a patterned retarder to receive the expanded optical signal from the beam expander and including a plurality of different patterns to cause different parts of the expanded optical signal from the beam expander to encounter different amounts of birefringence to produce a polarization scrambling effect on the expanded optical signal to create a scrambled expanded optical signal;

a motor arm to move the patterned retarder in and out of an optical path of the optical signal in at least one of an x-, y-, or z-plane to improve the polarization scrambling effect of the patterned retarder;

a beam reducer to reduce the scrambled expanded optical signal from the patterned retarder into a scrambled optical signal; and an optical fiber output to transmit the scrambled optical signal from the beam reducer to a downstream optical component.

2. The polarization scrambler of claim 1, wherein each of the optical fiber input and the optical fiber output comprises an array of N×X optical fibers, where N and X are integers.

3. The polarization scrambler of claim 1, wherein each of the beam expander and the beam reducer comprises one of a collimator, a gradient-index (GRIN) lens, or a bulk lens.

4. The polarization scrambler of claim 1, wherein the patterned retarder is formed from one of a textured material, a polymer, a birefringent material, or spatial-light-modulation (SLM) based material.

5. The polarization scrambler of claim 4, wherein the birefringent material comprises one of a liquid crystal, a dielectric thin film, or a phase controlled element.

6. The polarization scrambler of claim 1, wherein the plurality of patterns in the patterned retarder are arranged in a randomized pattern to randomly divide the expanded optical signal into smaller parts and cause the smaller parts of the expanded optical signal to encounter the different amounts of birefringence to produce different states of polarization that results in the polarization scrambling effect.

7. The polarization scrambler of claim 6, wherein the randomized pattern in the patterned retarder comprises one of a pixelated pattern, a radial pattern, a wave or zigzag pattern, a line or linear pattern, a checkered pattern, a textured pattern, a scaled pattern, or a gradient pattern.

8. The polarization scrambler of claim 1, wherein the motor arm is to vibrate or oscillate the patterned retarder to further improve the polarization scrambling effect.

9. A polarization scrambler, comprising:
an optical fiber input to transmit an optical signal;
a beam expander to expand the optical signal from the optical fiber input into an expanded optical signal, wherein the beam expander includes a patterned retarder to create a scrambled expanded optical signal, wherein:
the patterned retarder includes a plurality of different patterns that cause different parts of the expanded optical signal to encounter different amounts of birefringence to produce a polarization scrambling effect on the expanded optical signal that results in the scrambled expanded optical signal;
the patterned retarder further includes a motor arm to move the patterned retarder in and out of an optical path of the optical signal in at least one of an x-, y-, or z-plane to improve the polarization scrambling effect of the patterned retarder;

a beam reducer to reduce the scrambled expanded optical signal from the patterned retarder to create a scrambled optical signal; and an optical fiber output to transmit the scrambled optical signal to a downstream optical component.

10. The polarization scrambler of claim 9, wherein each of the optical fiber input and the optical fiber output comprises an array of N×X optical fibers, where N and X are integers.

11. The polarization scrambler of claim 9, wherein each of the beam expander and the beam reducer comprises one of a collimator, a gradient-index (GRIN) lens, or a bulk lens.

12. The polarization scrambler of claim 9, wherein the patterned retarder is formed from one of a textured material, a polymer, a birefringent material, or spatial-light-modulation (SLM) based material.

13. The polarization scrambler of claim 12, wherein the birefringent material comprises one of a liquid crystal, a dielectric thin film, or a phase controlled element.

14. The polarization scrambler of claim 9, wherein the plurality of patterns in the patterned retarder are arranged in a randomized pattern to randomly divide the expanded optical signal into smaller parts and cause the smaller parts of the expanded optical signal to encounter the different amounts of birefringence to produce different states of polarization that results in the polarization scrambling effect.

15. The polarization scrambler of claim 14, wherein the randomized pattern in the patterned retarder comprises one of a pixelated pattern, a radial pattern, a wave or zigzag pattern, a line or linear pattern, a checkered pattern, a textured pattern, a scaled pattern, or a gradient pattern.

16. The polarization scrambler of claim 9, wherein the motor arm is to vibrate or oscillate the patterned retarder to further improve the polarization scrambling effect.

17. A method comprising:
providing an optical fiber input to transmit an optical signal;
providing a beam expander to expand the optical signal from the optical fiber input into an expanded optical signal;
providing a patterned retarder to receive the expanded optical signal from the beam expander and including a plurality of different patterns to cause different parts of the expanded optical signal from the beam expander to encounter different amounts of birefringence to produce a polarization scrambling effect on the expanded optical signal to create a scrambled expanded optical signal;
providing a motor arm to move the patterned retarder in and out of an optical path of the optical signal in at least one of an x-, y-, or z-plane to improve the polarization scrambling effect of the patterned retarder;
providing a beam reducer to reduce the scrambled expanded optical signal from the patterned retarder into a scrambled optical signal; and
providing an optical fiber output to transmit the scrambled optical signal from the beam reducer to a downstream optical component.

18. The method of claim 17, wherein the plurality of patterns in the patterned retarder are arranged in a randomized pattern to randomly divide the expanded optical signal into smaller parts and cause the smaller parts of the expanded optical signal to encounter the different amounts of birefringence to produce different states of polarization that results in the polarization scrambling effect.

19. The method of claim 18, wherein the randomized pattern in the patterned retarder comprises one of a pixelated pattern, a radial pattern, a wave or zigzag pattern, a line or linear pattern, a checkered pattern, a textured pattern, a scaled pattern, or a gradient pattern.

20. The method of claim 17, wherein the motor arm is to vibrate or oscillate the patterned retarder to further improve the polarization scrambling effect.

* * * * *